United States Patent [19]

Teay

[11] Patent Number: 5,456,281

[45] Date of Patent: Oct. 10, 1995

[54] GAS REGULATOR WITH DOUBLE STABILIZING FUNCTION

[76] Inventor: Jaw-Shiunn Teay, 40, Niu-Chou Tzu, Ling-Nan Village, Dung-Shah Hsian, Tainan Hsien, Taiwan

[21] Appl. No.: 290,556

[22] Filed: Aug. 15, 1994

[51] Int. Cl.[6] .................................................. G05D 16/06
[52] U.S. Cl. .............................. 137/505.12; 137/505.46; 137/519; 137/557
[58] Field of Search ........................... 137/505, 505.12, 137/505.46, 557, 519, 614.19

[56] References Cited

U.S. PATENT DOCUMENTS

| | | | |
|---|---|---|---|
| 1,883,690 | 10/1932 | Gilgenberg | 137/505.12 |
| 2,576,443 | 11/1951 | Brandstrom et al. | 137/505.12 X |
| 2,662,348 | 12/1953 | Jacobsson | 137/505.12 |
| 3,386,458 | 6/1968 | Wasserman et al. | 137/505.12 X |
| 4,802,507 | 2/1989 | Willson | 137/505.12 X |
| 5,203,371 | 4/1993 | Teay | 137/614.19 X |

FOREIGN PATENT DOCUMENTS 16816 1/1956 Germany ......................... 137/505.12

*Primary Examiner*—Stephen M. Hepperle

[57] ABSTRACT

A gas regulator with a double pressure adjusting function has a valve body closed with a lower valve lid with two round gas chambers formed in the valve body and the valve lid, each gas chamber having a gas pressure adjuster to adjust pressure of incoming gas. A pressure controller is combined in a gas exit hole of the valve body to block immediately the gas exit hole in case of abnormal gas pressure flowing through the gas exit hole, and a gauge is provided near a gas intake of the valve body to check pressure of gas flowing in the first gas chamber.

1 Claim, 6 Drawing Sheets

GAS REGULATOR WITH DOUBLE STABILIZING FUNCTION

BACKGROUND OF THE INVENTION

This invention relates to a gas regulator with a double stabilizing function, more particularly to one wherein it is possible to adjust the pressure of gas coming therein three times to allow gas to flow out in a balanced condition and to automatically block gas from flowing out in case of leakage or malfunction of this regulator or a gas oven.

A known conventional gas regulator shown in FIG. 1 comprises a valve body 10, a pressure adjuster 11 and a valve lid 12 combined together.

The pressure adjuster 11 is combined with and located on an adjusting base tool of the valve body 10, having an adjusting plate 110, an adjusting film 113 connected with a pulling bolt 112, and a spring 114. In using this regulator, the pressure of gas in the valve body closed by the lid 12 forces the pressure adjuster 11 to function, with the adjusting plate 110 moving up and down as the adjusting film 113 inflates or deflates so that the gas pressure in a chamber defined by the valve body 10 and the valve lid 12 may be kept constant. However, in practical use, the adjusting plate 110 may lose its function after a long period of use, or a block piece 111 of the adjusting plate 110 may wear off after a long period of use, losing its function of stopping up a gas inlet hole. In addition, the adjusting plate 110 may separate from the pulling bolt 112 and cause breakage of the adjusting film 113, making it impossible to stabilize the gas pressure. Then, if the gas pressure in the chamber of the valve body 10 cannot be adjusted, it will cause over pressure of gas in the chamber, which is not detectable by a user. In addition, when the gas in a gas tank becomes very low, i.e. of low pressure or when a new full gas tank replaces the old one, i.e. of high gas pressure, the pressure of gas coming out of the gas regulator will be too weak or too strong, and be very unstable.

SUMMARY OF THE INVENTION

A main object of the present invention is a gas regulator in which it is possible to adjust the pressure of gas coming therein two times, to enable the gas to flow out to a gas oven in a steady and balanced condition.

A feature of this invention is a construction of a valve body, having a gas intake communicating with a first chamber with a first pressure adjuster therein, a second chamber communicating with the first chamber via a passageway, a second pressure adjuster located in the second chamber communicating with a gas exit hole near a gas exit tube, a round tube extending up from the gas exit hole and having two different diameter holes and a tubular projection extending up from the round tube.

Another feature of this invention is a pressure controller, which is in the gas exit hole and the round tube of the valve body, for stopping immediately the gas exit hole by means of an actuating rod with a stop and an anti-leak gasket at its bottom in case of abnormal gas pressure flowing through the gas exit hole.

DETAILED DESCRIPTION OF THE INVENTION

Figure 1:
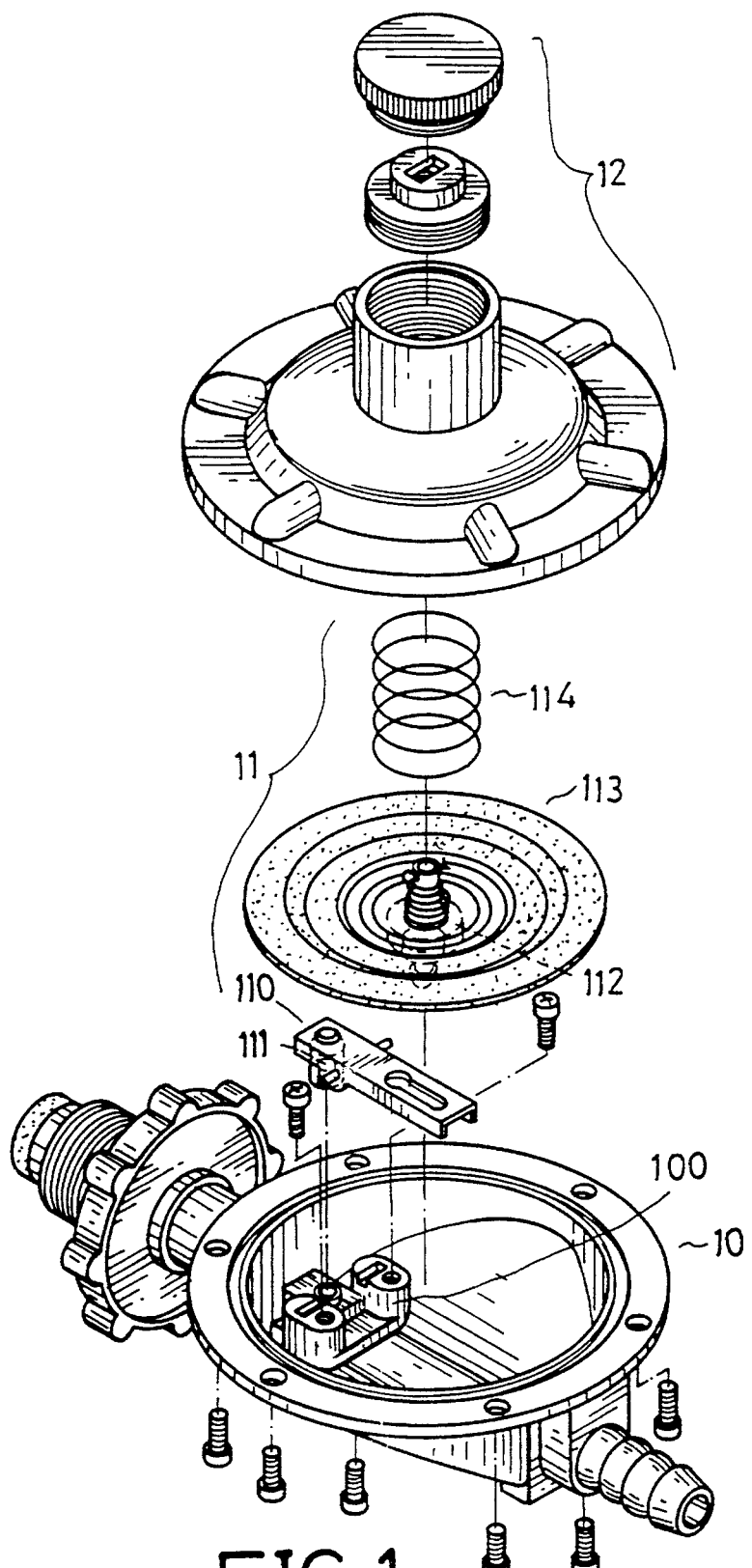
FIG. 1 is an exploded perspective view of a conventional gas regulator.
Figure 2:
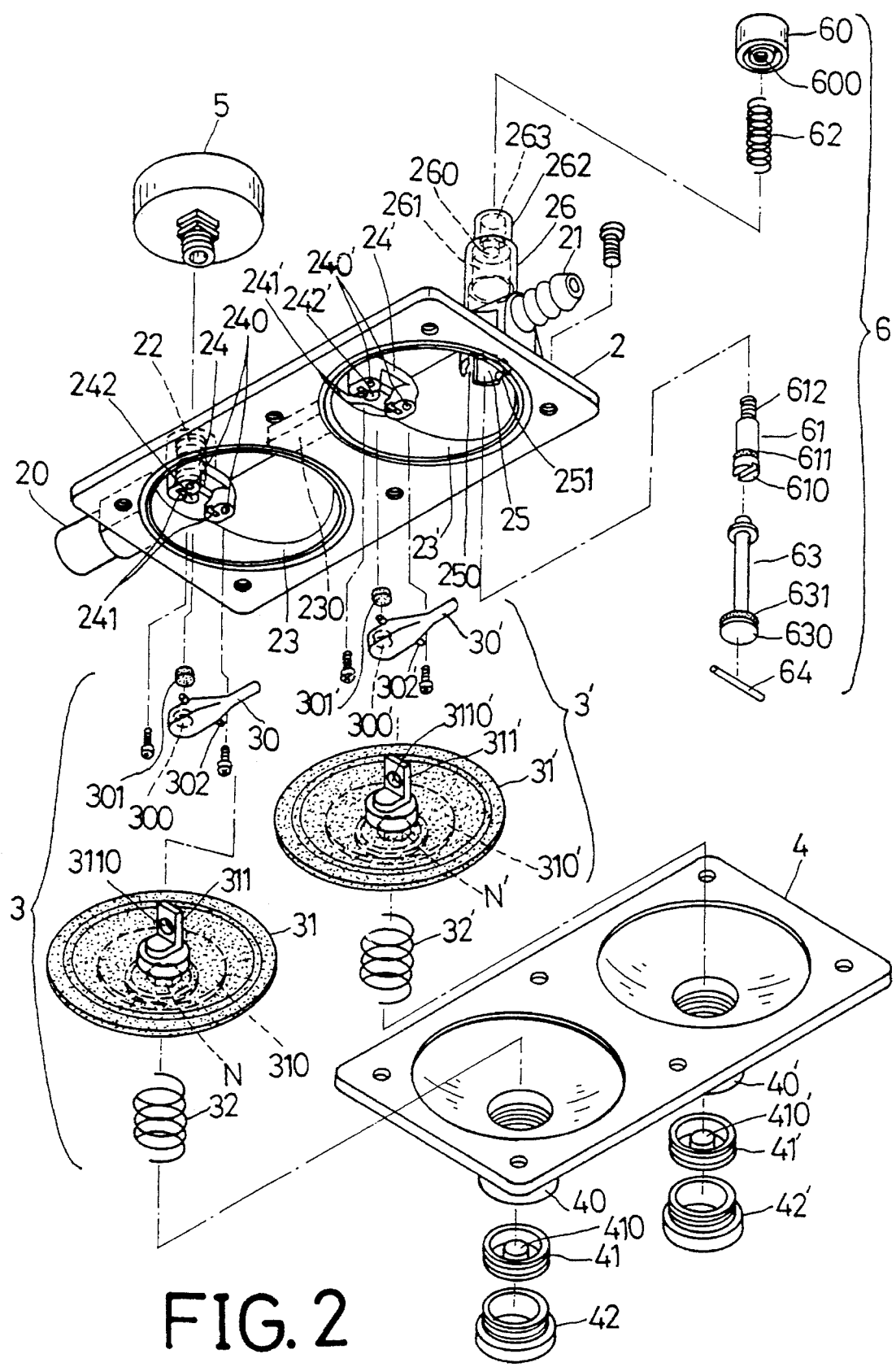
FIG. 2 is an exploded perspective view of a gas regulator with a double stabilizing function of the present invention.

A gas regulator with a double stabilizing function of the present invention, as shown in FIG. 2, comprises a valve body 2, two pressure adjusters 3, 3', a valve lid 4, a pressure gauge 5, and a pressure controller 6 as main components combined together.

The valve body 2 has a first round chamber 23 and a second round chamber 23', a passageway 230 connecting the two chambers 23, 23', a threaded post 22 projecting up on the first chamber 23, two pressure adjusting bases 24, 24' respectively provided under the threaded post 22 of the first chamber and a corresponding location in the second chamber 23' and the passageway 230, a threaded hole 240, 240' respectively provided in the adjusting bases 24, 24', a bar groove 241, 241' respectively provided beside the threaded hole 240, 240', a hole 242, 242' respectively provided beside the bar groove 241, 241' with the hole 242 communicating with the threaded post 22 and a gas intake tube 20, and the hole 242' communicating with the passageway 230, a gas exit hole 25 provided near the chamber 23' and communicating with the chamber 23', a notch 250 and a locating groove 251 provided under the gas exit hole 25, a round tube 26 extending up on the gas exit 25 and having two different diameter holes 260, 261, and a tubular projection 262 with a center hole 263 provided on the tube 26. A gas intake tube 20 is connected with a left side of the valve body 2, and a gas exit tube 21 is connected with a right side of the valve body 2.

The two pressure adjusters 3, 3' are respectively located in the first and the second chambers 23, and 23', and have adjusting handles 30, 30', adjusting films 31, 31', and springs 32, 32'. The adjusting handles 30, 30' are shaped with an incline from the rear to the front to become a cone, having holes 300, 300' filled with stops 301, 301', and a sidewise projection 302, 302'. The adjusting films 31, 31' have support pieces 310, 310' on a rear center surface fixed with nuts N, N', pulling members 311, 311' on an upper surface having connecting holes 3110, 3110' near upper ends for right ends of the adjusting handles 30, 30' to fit therein, and springs 32, 32' provided under the support pieces 310, 310' to bias the support pieces and the films.

The valve lid 4 is combined with and under the valve body 2, having female-threaded posts 40, 40' projecting downward, adjusting means 41, 41' and rotatable caps 42, 42' engaging the posts 40, 40', the adjusting means 41, 41' having center projections 410, 410' for the end of the springs 32, 32' to fit around.

The pressure gauge 5 is provided to engage with and is located on the threaded post 22 to check the pressure of the gas entering this gas regulator.

The pressure controller 6 is combined in the gas exit hole 25 and in the round tube 26, having a push cap 60, a push rod 61, a spring 62 to elastically urge against the push cap 60, an actuating rod 63, and a stop bar 64 combined together. The push cap 60 is deposited on the tubular projection 262 of the round tube 26, having a female-thread 600. The push rod 61 extends in the gas exit hole 25 and the round tube 26, having a block piece 610 at the bottom and an anti-leak gasket 611 on the block piece 610 to block the hole 261 of the round tube 26 thereby preventing gas leaking therefrom. The push rod 61 also has a male thread 612 on the upper portion. The spring 62 fits in the center hole 263, and the push cap 60 covers the tubular projection 262, engaging the male thread 612 of the push bar 61. The actuating rod 63 has a block piece 630 and an anti-leak gasket 631 on the block piece 630, and a stop bar 64 which fits in the locating groove 251 of the gas exit hole 25.

Figure 3:
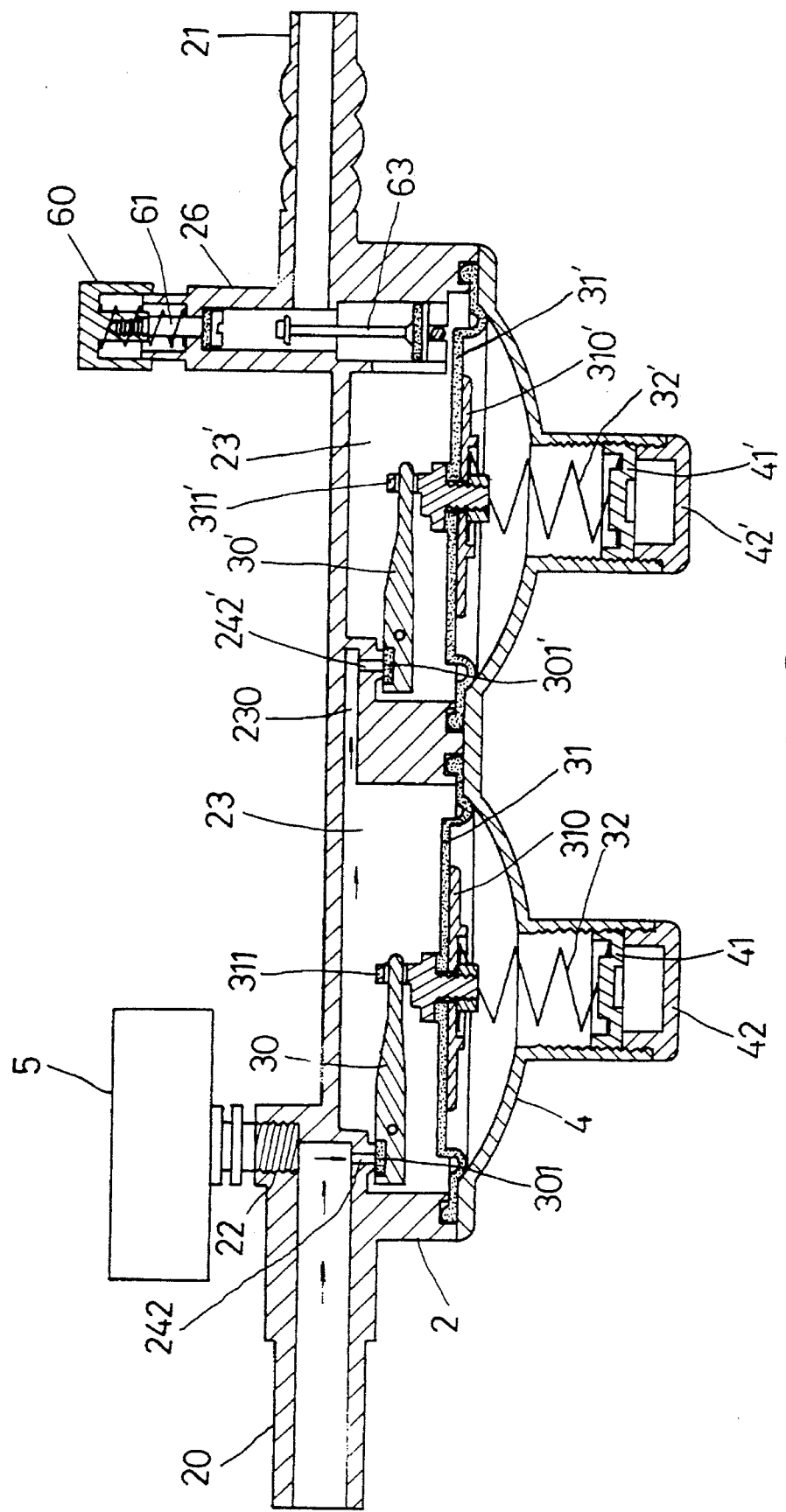
FIG. 3 is a cross-sectional view of the gas regulator with a double stabilizing function of the present invention, showing it in gas stopping condition.
Figure 4:
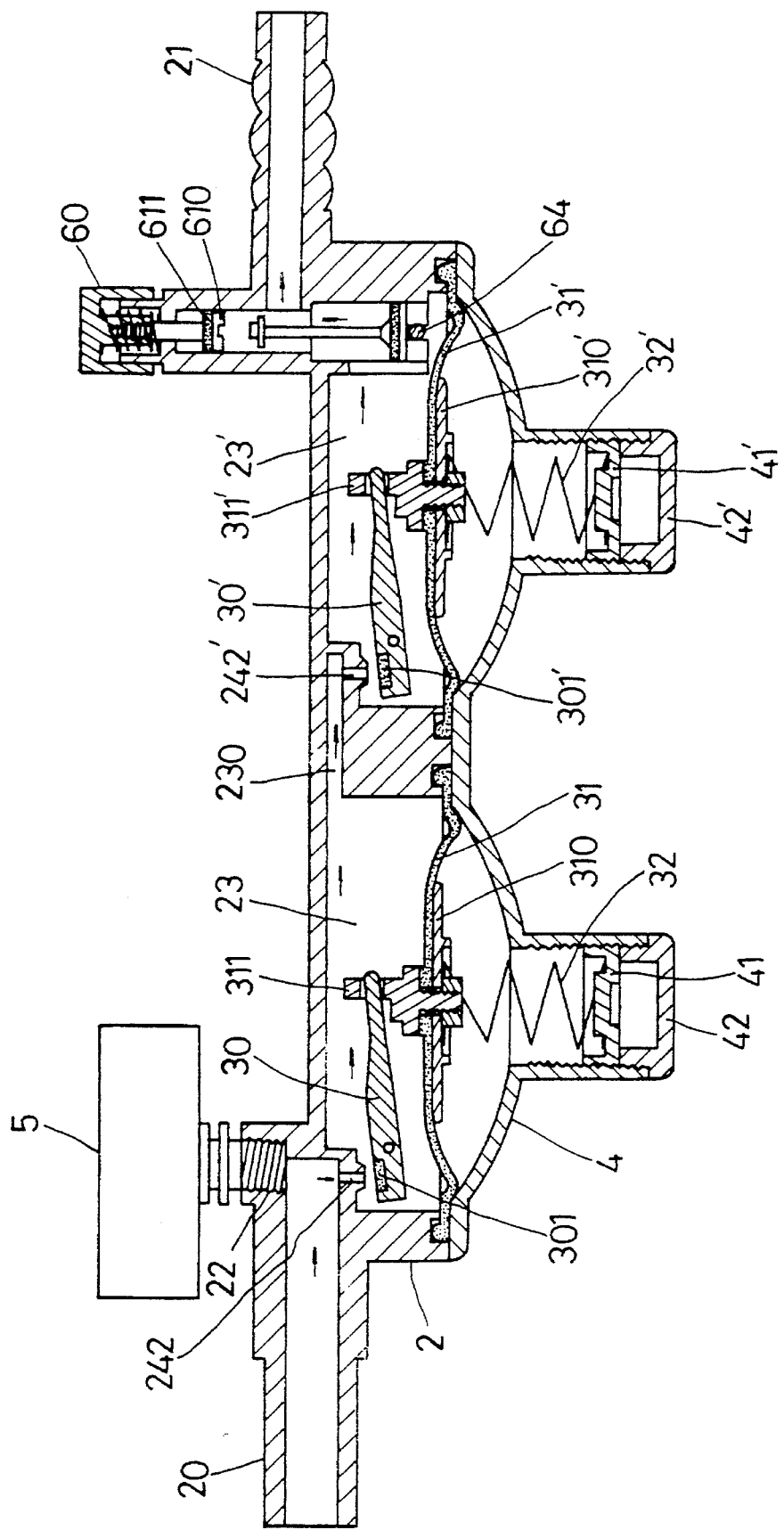
FIG. 4 is a cross-sectional view of the gas regulator with a double stabilizing function of the present invention, showing it in gas flowing condition.

When gas is used in a normal manner, the gas of a gas tank flows through the gas intake tube 20, the hole 242 of the first adjusting base 24 to fill the first chamber 23. In case of high pressure or a large flow of gas, the flowing gas fills up the first chamber 23, forcing the first pressure adjuster 3 to work, causing the left end of the adjusting handle 30 to move up and inflating the adjusting film 31 to compress the spring 32. Then if the adjusting handle 30 becomes horizontal, the stop 301 will block the hole 242 as shown in FIG. 3, stabilizing the pressure in the first chamber 23. Then the gas in the first chamber 23 flows through the passageway 230 and through the hole 242' of the second adjusting base 24' into the chamber 23'. Under this circumstance, the spring 32 recovers its elasticity, pushing the film 31, forcing the adjusting handle 30 to swing down with the stop 301 no more blocking the hole 242 as shown in FIG. 4. Gas will continue to flow into the first chamber 23, and the gas flowing from the first chamber 23 into the second chamber 23' is transported in a stabilized condition. Then the second adjuster 3' works to stabilize the pressure of the gas in the second chamber 23' just as the first adjuster 3 does in the first chamber 23 as described above. Therefore, the gas flows in and out in a stabilized pressure, without stoppage or unstable gas flow.

Figure 5:
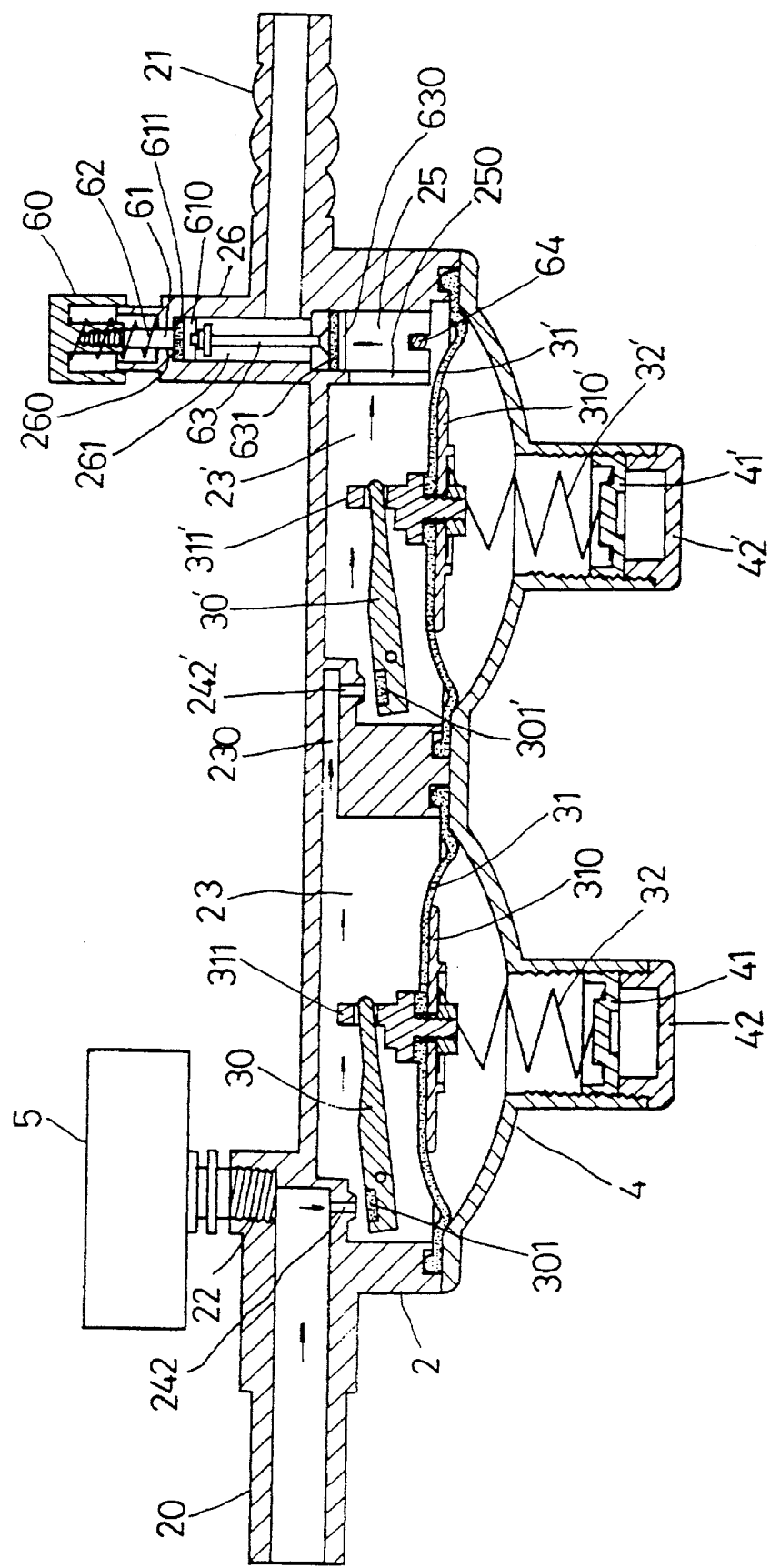
FIG. 5 is a cross-sectional view of the gas regulator with a double stabilizing function of the present invention, showing a gas exit hole blocked by an actuating rod.
Figure 6:
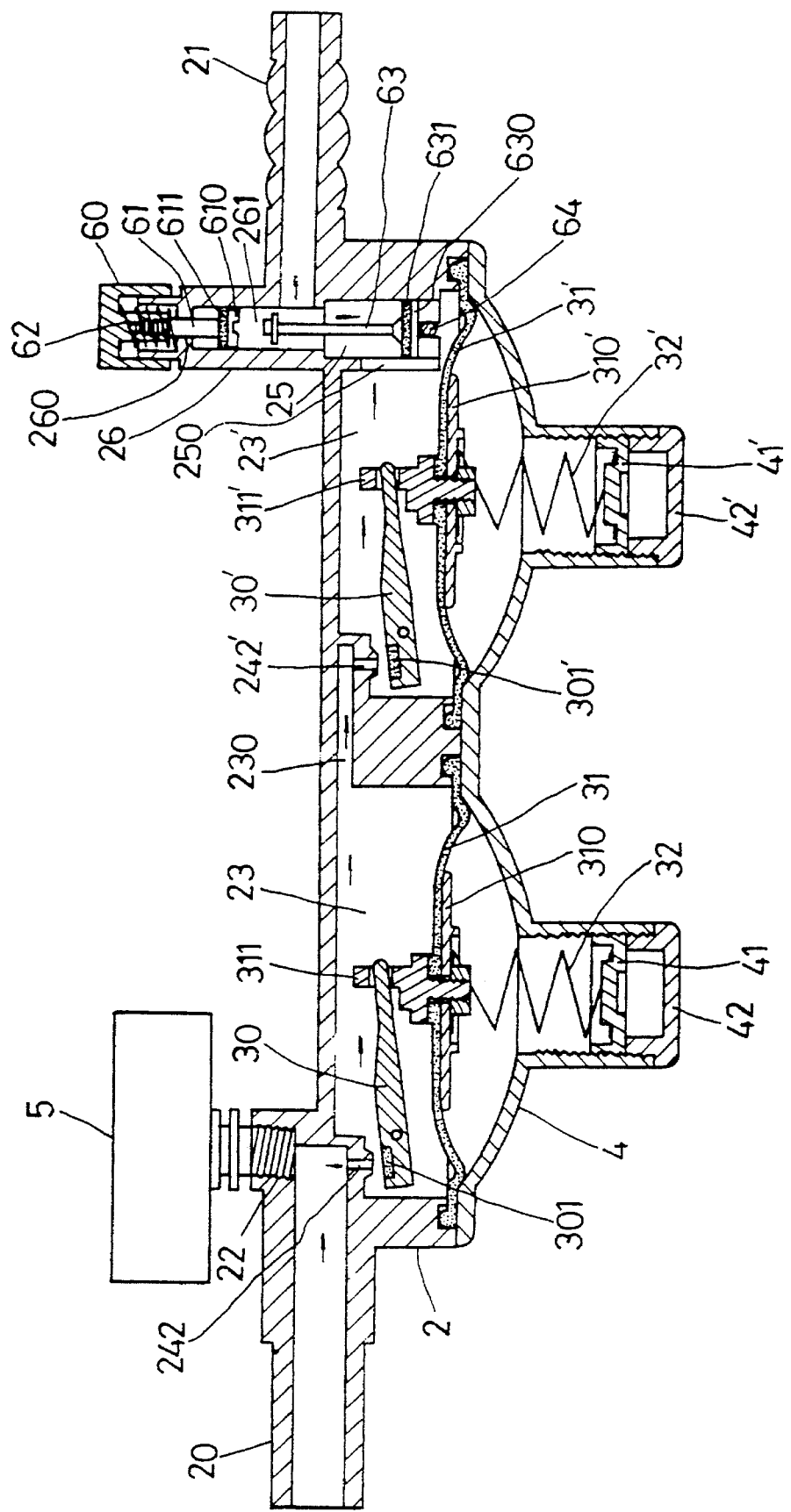
FIG. 6 is a cross-sectional view of the gas regulator with a double stabilizing function of the present invention, showing a pressure controller in action.

Provided that a gas oven connected with the gas exit tube 2t should get out of order, with gas leaking out thereof, the pressure in the second chamber 23' would become larger than that of the leaking side, i.e. the exit tube 21 because of the exit tube 21 having larger speed of flowing gas than the intake tube 20. Therefore, the original balanced pressure is broken, and the actuating rod 63 will be pushed up by the pressure difference, blocking the gas exit hole 25 as shown in FIG. 5, as an automatic cutoff gas supply. Gas leakage is surely prevented to secure safety of the gas equipment. If gas is wanted to be supplied to the gas oven after the leakage is corrected, the push cap 60 of the controller 6 is pushed down, with the push rod 61 together with the block piece 610 moving down to push down the actuating rod 63 with the block piece 630, which then disengages from the gas exit hole 25. After that the push cap 60 is released to be pushed up by the spring 62, with gas supply is recovered as shown in FIG. 6.

This gas regulator has several advantages as follows, as can be understood from the above description.

1. Gas pressure can be maintained stable to flow out to a gas oven for use.

2. In case of a malfunction of the gas supply with the gas chambers being over pressured or gas leakage happening, it can immediately function to block the gas exit hole and to indicate such blockage by means of the gas gauge.

3. The gas gauge can indicate unbalanced pressure in the gas chambers when gas flows into them, if such an event occurs, informing a user to correct this gas regulator or the gas oven.

I claim:

1. A gas regulator with a double stabilizing function comprising:

a valve body connected with a gas intake tube at one side, and with a gas exit tube at an opposite side, the valve body having first and second laterally displaced and generally co-planar chambers, and a gas intake communicating with said gas intake tube and said first chamber;

first and second pressure adjusters located in the first and second chambers, respectively, each having an adjusting handle oriented such that the adjusting handles are in linear alignment with each other, an adjusting film connected to the adjusting handle, and a spring acting on the adjusting film, said adjusting handles inclining to a front from a rear and shaped as a cone, a recess on a side surface and a stop located therein, and a sidewise projection, said pressure film shaped concave and having a support piece supporting a bottom center surface by means of a nut, a pulling member fixed on an upper center surface of each of the pressure films and having a sidewise hole at an upper end through which an end of the adjusting handle is inserted, said spring being located to act on the bottom center of said support piece;

a valve lid attached to the valve body, the valve lid having two tubular posts extending centrally therefrom, each of said posts having a female thread engaging an adjusting means with a rotating cap, said adjusting means having a projecting stud on a bottom for said spring of each said pressure adjuster to fit around;

a pressure gauge attached to an upper section of the valve body on the gas inlet and in communication with the gas intake tube;

wherein said first chamber has the first pressure adjuster, said first chamber and said second chamber communicate with each other by means of a passageway, said second chamber has said second pressure adjuster, a gas exit hole provided in said second chamber communicating with said gas exit tube, a notch and two locating grooves are located under said gas exit hole, a round tube is provided communicating with said gas exit hole and having two different diameter holes, a projecting tubular post is provided on said round tube and has a center hole, a pressure controller is located in said gas exit hole and in said round tube and comprising a push cap, a push rod, a spring and an actuating rod, said actuating rod and said push rod respectively having a block piece and an anti-leak gasket on the block piece at the bottom;

whereby said first pressure adjuster in said first chamber adjusts the pressure of gas in said first chamber, said second pressure adjuster in said second chamber adjusts the pressure of gas in the second chamber from said first chamber so that gas is kept in a balanced condition to flow out of said gas exit hole, without possibility of unstable gas flow caused by pressure difference of the incoming gas, said actuating rod of said pressure controller acted on so as to be pushed by abnormally high or low gas pressure to block said gas exit hole to automatically cut-off the gas supply from the regulator.

\* \* \* \* \*